United States Patent
Liu et al.

(10) Patent No.: US 10,652,778 B2
(45) Date of Patent: May 12, 2020

(54) METHOD AND APPARATUS FOR MOBILITY MANAGEMENT

(71) Applicant: Telefonaktiebolaget LM Ericsson (publ), Stockholm (SE)

(72) Inventors: Jinhua Liu, Beijing (CN); Rui Fan, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 64 days.

(21) Appl. No.: 15/740,797

(22) PCT Filed: Nov. 17, 2017

(86) PCT No.: PCT/CN2017/111547
§ 371 (c)(1),
(2) Date: Dec. 29, 2017

(87) PCT Pub. No.: WO2018/166231
PCT Pub. Date: Sep. 20, 2018

(65) Prior Publication Data
US 2018/0338262 A1    Nov. 22, 2018

(30) Foreign Application Priority Data
Mar. 17, 2017  (WO) ................ PCT/CN2017/077078

(51) Int. Cl.
*H04W 28/02*  (2009.01)
*H04W 64/00*  (2009.01)
(Continued)

(52) U.S. Cl.
CPC ..... *H04W 28/0226* (2013.01); *H04L 43/0882* (2013.01); *H04W 24/10* (2013.01);
(Continued)

(58) Field of Classification Search
None
See application file for complete search history.

(56) References Cited

U.S. PATENT DOCUMENTS

2011/0255436 A1   10/2011  Jian et al.
2011/0299781 A1*  12/2011  Schoenblum ........... G06T 5/002
                                                          382/195
(Continued)

FOREIGN PATENT DOCUMENTS

CN       1930800 A        3/2007
CN      101449500 A        6/2009
(Continued)

OTHER PUBLICATIONS

International Search Report and Written Opinion for Application No. PCT/CN2017/111547, dated Feb. 14, 2018, 10 pages.
(Continued)

*Primary Examiner* — Michael J Moore, Jr.
(74) *Attorney, Agent, or Firm* — NDWE LLP (57) ABSTRACT

Method for a communication device switching among a plurality of sub-bands in a wireless network. The method comprises measuring a signal quality for an operation sub-band, comparing the signal quality with a signal quality threshold, determining a switch action according to the comparison of the signal quality with the signal quality threshold, and switching from the operation sub-band according to the determined switch action. The communication device and access node thereof are also disclosed.

10 Claims, 5 Drawing Sheets

(51) Int. Cl.
*H04L 12/26* (2006.01)
*H04W 24/10* (2009.01)
*H04W 36/30* (2009.01)
*H04W 36/06* (2009.01)

(52) U.S. Cl.
CPC ....... *H04W 28/0236* (2013.01); *H04W 36/30* (2013.01); *H04W 64/006* (2013.01); *H04W 36/06* (2013.01)

(56) References Cited

U.S. PATENT DOCUMENTS

| | | | |
|---|---|---|---|
| 2013/0058310 A1* | 3/2013 | Park | H04W 72/082 370/331 |
| 2014/0098663 A1* | 4/2014 | Vos | H04W 72/0486 370/230 |
| 2014/0378134 A1* | 12/2014 | Nakamori | H04W 36/0094 455/436 |
| 2015/0249941 A1 | 9/2015 | Wang et al. | |
| 2016/0249357 A1* | 8/2016 | Green | H04W 24/08 |
| 2017/0374587 A1* | 12/2017 | Liu | H04L 5/0048 |
| 2018/0124748 A1* | 5/2018 | Baldemair | H04L 5/0053 |
| 2018/0234896 A1* | 8/2018 | Liu | H04W 36/00 |

FOREIGN PATENT DOCUMENTS

| | | |
|---|---|---|
| CN | 102577511 A | 7/2012 |
| CN | 103428748 A | 12/2013 |
| WO | 2016190711 A1 | 12/2016 |

OTHER PUBLICATIONS

Extended European Search Report for Application No. 17814286.5, dated Jul. 10, 2019, 14 pages.

Nokia Networks, "Further Discussion on Intra-frequency Cell Detection with Narrowband Operation," 3GPP TSG-RAN WG4 Meeting #76bis, R4-155847, Oct. 12-16, 2015, retrieved from http://www.3gpp.org/ftp/tsg_ran/WG4_Radio/TSGR4_76bis/Docs/ on Oct. 5, 2015, 3 pages.

Communication under Rule 71(3) EPC for Application No. 17814286.5, dated Feb. 21, 2020, 68 pages.

* cited by examiner

METHOD AND APPARATUS FOR MOBILITY MANAGEMENT

CROSS-REFERENCE TO RELATED APPLICATIONS

This application is a National stage of International Application No. PCT/CN2017/111547, filed Nov. 17, 2017, which claims priority to International Application No. PCT/CN2017/077078, filed Mar. 17, 2017, which are hereby incorporated by reference.

TECHNICAL FIELD

The present disclosure generally relates to a method for a mobility management procedure in wireless network and a communication device and an access node thereof.

BACKGROUND

Nowadays, in order to meet the demand for ever increasing system capability and support a larger amount of communication devices, a system carrier bandwidth of a wireless communication network is growing broader and broader, from 100 MHz to 1 GHz, for example. In practice, not all the communication devices could support a full system carrier bandwidth due to hardware and cost restrictions. A communication device which supports a narrower frequency band could be configured to operate in a sub-band of the system carrier. Furthermore, not all the services require such a large system carrier bandwidth, therefore a communication device which supports a full system carrier bandwidth may also be configured to operate in a sub-band when its service only needs a narrower frequency bandwidth for power saving consideration, for example.

In practice, there may be a plurality of sub-bands for a system carrier in a wireless network, and reference signals for mobility measurement, such as Primary Synchronization Signal (PSS), Secondary Synchronization Signal (SSS) for Long Term Evolution (LTE) systems for example, are only transmitted over certain sub-bands out of the plurality of sub-bands. For a communication device operating in a sub-band without the reference signals for mobility measurement, since there are no reference signals for mobility measurement in its operation sub-band, a mobility measurement could be a problem for such a communication device.

A measurement gap for mobility measurement may be configured for a communication device, which is operating in a sub-band in which no reference signals for mobility measurement are transmitted. In the configured measurement gap, there is no transmission and reception in the operation sub-band for the communication device, and the communication device measures the signal quality with respect to the reference sequences for mobility measurement and then switches back to the original operation sub-band for continuing data communication, resulting in a negative impact of considerable service interrupt and delay, which may be unacceptable for delay-sensitive services.

SUMMARY

It is an object of the present disclosure to resolve or alleviate at least one of the problems mentioned above.

According to one aspect of the disclosure, there is provided a method in a communication device in a wireless network. The system carrier of the wireless network comprises a plurality of sub-bands, and reference signals for mobility measurement are transmitted in at least one of the plurality of sub-bands. The method comprises a step of measuring a signal quality for an operation sub-band, a step of comparing the signal quality with a signal quality threshold, a step of determining a switch action according to the comparison of the signal quality with the signal quality threshold and a step of switching from the operation sub-band according to the determined switch action.

According to a further aspect of the disclosure, the operation sub-band of the communication device is a sub-band in which the reference signals for mobility measurement are not transmitted and the signal quality threshold is a first signal quality threshold. The step of switching from the operation sub-band according to the determined switch action further comprises a step of switching to a sub-band in which the reference signals for mobility measurement are transmitted in response to the comparison that the signal quality is lower than the first signal quality threshold.

According to a further aspect of the disclosure, the operation sub-band of the communication device is a sub-band in which the reference signals for mobility measurement are transmitted, and the signal quality threshold being a second signal quality threshold. The step of switching from the operation sub-band according to the determined switch action further comprises a step of switching to a sub-band in which the reference signals for mobility measurement are not transmitted in response to the comparison that the signal quality is higher than the second signal quality threshold.

According to one aspect of the disclosure, there is provided a method in an access node in a wireless network. The system carrier of the wireless network comprises a plurality of sub-bands, and reference signals for mobility measurement are transmitted in at least one of the plurality of sub-bands. The method comprises a step of determining whether a switch condition is satisfied for a communication device and a step of configuring the communication device with a switch action in response to determining the switch condition being satisfied for the communication device.

According to a further aspect of the disclosure, the step of determining whether a switch condition is satisfied further comprises a step of receiving a measurement report from the communication device, a step of determining a radio quality according to the measurement report and a step of comparing the radio quality with a radio quality threshold. The step of configuring the communication device with a switch action in response to determining the switch condition being satisfied for the communication device further comprises a step of configuring the communication device with a switch action according to the comparison of the radio quality with the radio quality threshold.

According to a further aspect of the disclosure, an operation sub-band of the communication device is a sub-band in which the reference signals for mobility measurement are not transmitted, and the radio quality threshold is a first radio quality threshold. The step of configuring the communication device with a switch action according to the comparison result of the radio quality with the radio quality threshold further comprises a step of configuring the communication device to switch to a sub-band in which the reference signals for mobility measurement are transmitted in response to the comparison result that the radio quality being lower than the first radio quality threshold.

According to a further aspect of the disclosure, an operation sub-band of the communication device is a sub-band in which the reference signals for mobility measurement are transmitted, and the radio quality threshold is a second radio quality threshold. The step of configuring the communication device with a switch action according to the comparison of the radio quality with the radio quality threshold further comprises a step of configuring the communication device to switch to a sub-band in which the reference signals for mobility measurement are not transmitted in response to the comparison result that the radio quality being higher than the second radio quality threshold.

According to a further aspect of the disclosure, the step of determining whether a switch condition is satisfied further comprising a step of measuring a load for a sub-band in which the reference signals for mobility measurement are transmitted, and a step of comparing the load with a load threshold. The step of configuring the communication device with a switch action in response to determining the switch condition being satisfied for the communication device further comprises a step of selecting one or more communication devices operating in the sub-band in which the reference signals for mobility measurement are transmitted, and a step of configuring the one or more communication devices to switch to a sub-band in which the reference signals for mobility measurement are not transmitted.

BRIEF DESCRIPTION OF THE DRAWINGS

Exemplary features of the present invention are set forth in the appended claims. However, the present invention, its implementation mode, other objectives, features and advantages will be better understood through reading the following detailed description on the exemplary embodiments with reference to the accompanying drawings, where in the drawings:

DETAILED DESCRIPTION OF EMBODIMENTS

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meanings as commonly understood. It will be further understood that a term used herein should be interpreted as having a meaning consistent with its meaning in the context of this specification and the relevant art and will not be interpreted in an idealized or overly formal sense unless expressly so defined herein.

The present disclosure is described below with reference to block diagrams and/or flowchart illustrations of methods, nodes, devices and/or computer program products according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology may be embodied in hardware and/or in software (including firmware, resident software, micro-code, etc.). Furthermore, the present technology may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that may contain, store, communicate, propagate, or transport the program for use by or in connection with the instruction execution system, apparatus, or device.

Figure 1:
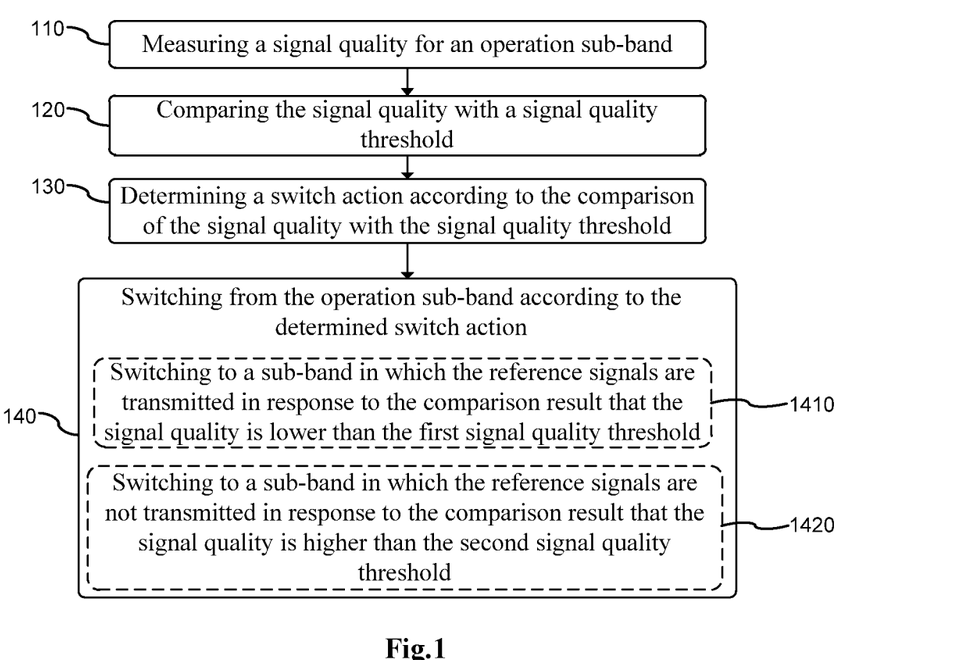
FIG. 1 schematically illustrates an exemplary flow diagram for a communication device switching from an operation sub-band for mobility measurement in a wireless network according to one or more embodiments of the present invention.
Figure 4:
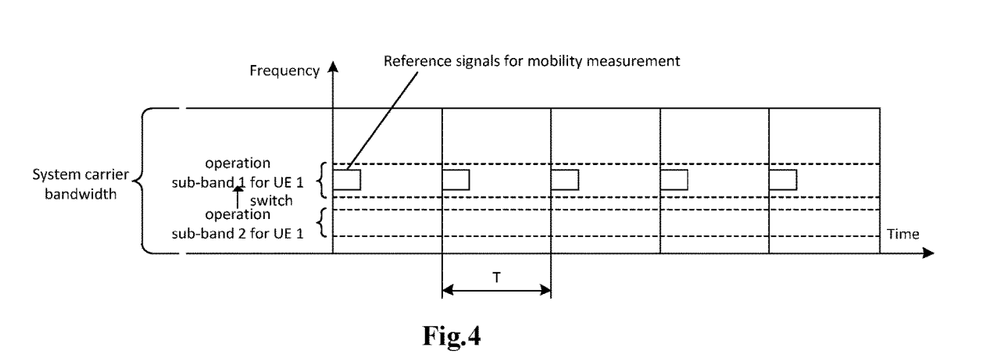
FIG. 4 schematically shows an exemplary communication device switching from an operation sub-band to another sub-band in which reference signals for mobility measurement are transmitted according to one or more embodiments of the present invention.

FIG. 1 schematically illustrates an exemplary flow diagram for a communication device switching from an operation sub-band for mobility measurement in a wireless network according to one or more embodiments of the present invention. An operation sub-band for a communication device refers to the sub-band in which the communication is operating under a control of an access node. The communication device transmits data to, and receives data and control signalings from the access node in the operation sub-band for the communication device. For example, as shown in FIG. 4, if the communication device switches from the current operation sub-band, e.g., sub-band 2, to another sub-band, e.g., sub-band 1, the operation sub-band for the communication device changes from sub-band 2 to sub-band 1 accordingly.

In the present disclosure, communication devices also known as mobile terminals, wireless terminals and/or User Equipment (UE) are enabled to communicate wirelessly with an access node in a wireless network, sometimes also referred to as a cellular radio system. For instance, a communication device may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or Personal Computer (PC). The communication device may be a portable, pocket-storable, hand-held, computer-comprised, or vehicle-mounted mobile device, enabled to communicate voice and/or data, via a wireless or wired connection.

Figure 2:
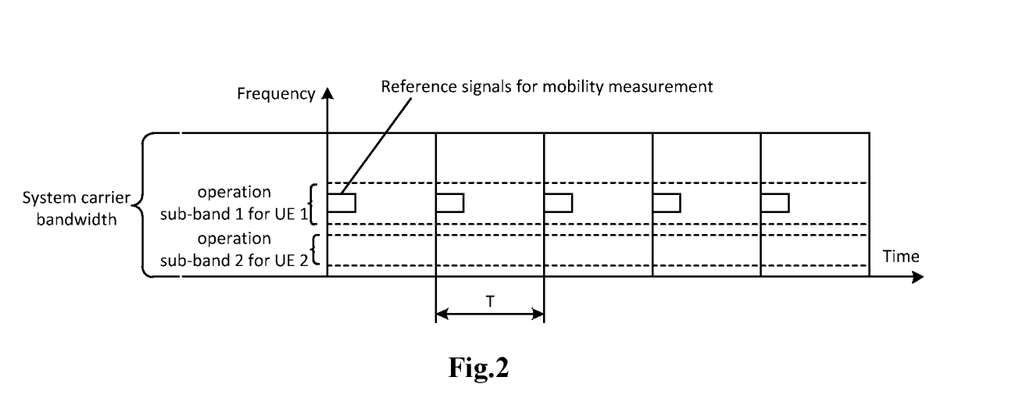
FIG. 2 schematically shows two exemplary communication devices operating in different sub-bands in a system carrier according to one or more embodiments of the present invention.
Figure 3:
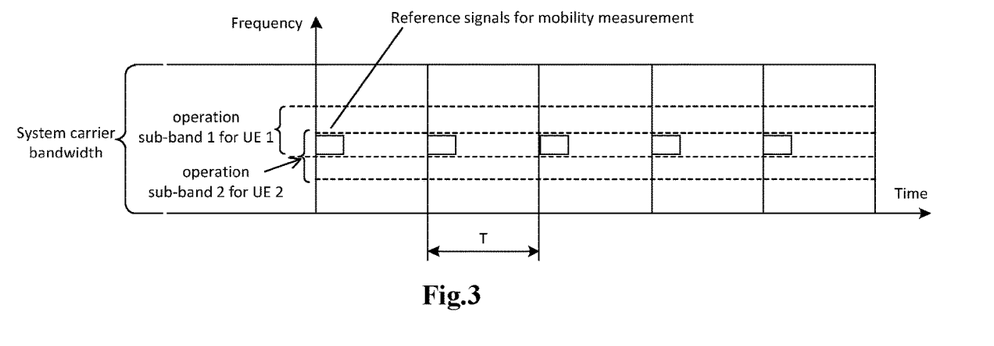
FIG. 3 schematically shows two exemplary communication devices operating in different sub-bands in a system carrier according to one or more embodiments of the present invention.

Referring to FIG. 2, there are a plurality of sub-bands for a system carrier in a wireless network. The reference signals for mobility measurement are transmitted from at least one of the plurality of communication devices, according to time and frequency properties of the specific reference signals employed in the system design. For example, the reference signals for mobility measurement could be at least one of Primary Synchronization Signals (PSS), Secondary Synchronization Signals (SSS), Extended Synchronization Signals (ESS), Mobility Reference Signals (MRS), and/or Channel State Information-Reference Signals (CSI-RS) in the 3rd Generation Partnership Project (3GPP) Long Term Evolution (LTE) systems and next generation communication systems. As shown in FIG. 2, UE 1 is operating in its operation sub-band in which the reference signals for mobility measurement are transmitted, while UE 2 is operating in its operation sub-band in which no reference signals for mobility measurement are transmitted. The periodic cycle for the reference signal repetition is illustrated as T In FIG. 2, there is no overlap in the frequency domain for the operation sub-band for the UE 1 and the operation sub-band for the UE 2. There may exist more than one sub-band in which the reference signals for mobility measurement are transmitted. One preferable sub-band configuration may be an overlapping bandwidth of the sub-bands in which the reference signals for mobility measurement are transmitted is equal to the bandwidth occupied by the reference signals for mobility measurement, as shown in FIG. 3 for example. It is noted that with the teaching and guidance in this disclosure, a skilled in the art could design and contemplate different sub-band configurations, e.g., different portioning in the frequency domain for the sub-bands in a system carrier, according to specific reference signal properties and system requirements.

For a communication device operating in an operation sub-band without reference signals for mobility measurement transmitted therein, in a measurement gap implementation, the communication device may stop transmitting and receiving data in its operation sub-band, measure the reference signals for mobility measurement and then return to its operation sub-band to continue its transmission, leading to an unavoidable service interruption. In this disclosure, for a communication device operating in an operation sub-band without reference signals for mobility measurement transmitted therein, if the signal quality of this communication device is lower than a preconfigured threshold, the communication device may switch to a sub-band in which the reference signals for mobility measurement are transmitted, and the communication device could measure the reference signals for mobility measurement from different cells in order to perform a mobility procedure, such as inter-cell handover for example. Meanwhile, a communication device with good signal quality can be switched from a sub-band in which the reference signals for mobility measurement are transmitted to another sub-band in which no reference signals for mobility measurement are transmitted, in order to reduce the load of the sub-bands in which reference signals for mobility measurement are transmitted. It is noted that the switch between a sub-band with the reference signals for mobility measurement transmitted therein and a sub-band without the reference signals for mobility measurement transmitted therein for a communication device could be triggered either by the communication device or the access node. In this way, the sub-bands in which a mobility measurement could be performed are dynamically shared between different communication devices and a communication device can be continuously served during the mobility measurement, i.e., no measurement gap is required anymore. It is desirable that during the measurement in the newly switched-to sub-band in which the reference signals for mobility measurement are transmitted, the communication device may still monitor Downlink Control In formation (DCI) transmission and perform the data transmission and reception in the newly switched-to sub-band.

It will be appreciated for the person skilled in the art that the term mobility management generally refers to radio resource management including time and frequency resource and/or serving cell reallocation for a communication device through mobility management procedures for the communication device, such as handover or cell reselection procedures for example. The term mobility measurement refers to a signal quality measurement in the mobility management procedures. It should be also noted that unless specified otherwise, the term mobility measurement and Radio Resource Management (RRM) measurement could be used interchangeably throughout this disclosure.

Returning to FIG. 1, in step 110, a communication device measures a signal quality for an operation sub-band of the communication device. In one example, as discussed above, the operation sub-band of the communication device may be a sub-band in which no reference signals for mobility measurement are transmitted. For this case, the communication device may measure the signal quality with respect to other reference signals transmitted in the operation sub-band of the communication, such as Cell-Specific References (CSR) or UE-Specific Reference Signals for example. In another example, the operation sub-band of the communication device may be a sub-band in which reference signals for mobility measurement are transmitted, and for this case, the communication device may measure the signal quality with respect to the reference signals for mobility measurement. It may also measure the signal quality with respect to other reference signals, such as CSR or UE-Specific Reference Signals. It is desirable for the person skilled in the art to employ different signal quality measurement mechanisms without departing from the teachings in this disclosure.

In step 120, the communication device compares the signal quality with a signal quality threshold. The signal quality threshold may be preconfigured by the network, or it can be updated periodically according to different system configurations. More specifically, if no reference signals for mobility measurement are transmitted in the operation sub-band of the communication device, the signal quality threshold may be a first signal quality threshold. In such a circumstance, the communication device measures the signal quality of the operation sub-band and compares it with the first signal quality threshold to monitor the channel quality of the operation sub-band. If the signal quality is lower than the first signal quality threshold, it means the channel quality is so bad that a mobility procedure may be triggered for the communication device. On the other hand, if the reference signals for mobility measurement are transmitted in the operation sub-band of the communication device, the signal quality threshold may be a second signal quality threshold. In such a circumstance, the communication device measures the signal quality of the operation sub-band and compares it with the second signal quality threshold to monitor the channel quality. If the signal quality is higher than the second signal quality threshold, it means that the channel quality is so good and the communication device may be switched to a sub-band in which no reference signals for mobility measurement are transmitted, in order to reduce the load of the sub-bands in which the reference signals for mobility measurement are transmitted.

In step 130, the communication device determines a switch action according to the comparison of the signal quality with the signal quality threshold. As discussed above, the signal quality threshold could be either one of the first signal quality threshold and the second signal quality threshold, depending on whether there are reference signals for mobility measurement transmitted in the operation sub-band of the communication device. The switch action for a communication device refers to a switching decision for the communication devices from one operation sub-band to another sub-band. Referring to FIG. 4, it is assumed that signal quality of operation sub-band 2 for UE 1 is lower than the first signal quality threshold. In this case, a switch action for UE 1 corresponds to a switching decision from sub-band 2 to sub-band 1.

In step 140, the communication device switches from the operation sub-band according to the determined switch action. As aforementioned, according to one embodiment of the disclosure, the operation sub-band of the communication device may be a sub-band in which the reference signals for mobility measurement are not transmitted, and the signal quality threshold is the first signal quality threshold. More specifically, in step 1410, the communication device switches to a sub-band in which the reference signals for mobility measurement are transmitted in response to the comparison result that the signal quality is lower than the first signal quality threshold. According to another embodiment of the disclosure, the operation sub-band of the communication device may be a sub-band in which the reference signals for mobility measurement are transmitted, and the signal quality threshold is the second signal quality threshold. In step 1420, the communication device may switch to a sub-band in which the reference signals for mobility measurement are not transmitted in response to the comparison result that the signal quality is higher than the second signal quality threshold.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps may be executed, at least partially, in parallel. A given step may not have finished completely before a next step is started. Moreover, fewer than all the illustrated blocks may be required to implement an example methodology. Blocks may be combined or separated into multiple components. Furthermore, additional or alternative methodologies can employ additional, not illustrated blocks.

According to a further embodiment of the disclosure, after step 130, the communication device may report the determined switch action to the access node for a further decision made by the network side. The access node may take the load of different sub-bands or the service requirements for example into consideration and make a further switch decision for the communication device according to different system implementations and configurations. It is desirable for the skilled in the art to develop different implementations according to different system requirements without departing from the spirit of this disclosure. It will be appreciated that different practical implementation strategies should not be construed as any limitation to the scope of this invention. It should be also appreciated that the signal quality could be Reference Signal Receiving Power (RSRP), Reference Signal Receiving Quality (RSRQ), Received Signal Strength Indication (RSSI), Signal to Noise Ratio (SNR), or Signal to Interference plus Noise Ratio (SINR), which can be chosen by one skilled in the art according to different system implementation and application scenarios.

Typically, an access node may serve or cover one or several cells of the wireless communication system. That is, the access node provides radio coverage in the cell(s) and communicates over an air interface with communication devices operating on radio frequencies within its range. The access node in some wireless communication systems may be also referred to as "eNB", "eNodeB", "NodeB", "B node", gNode B' or 'gNB', for example, depending on the technology and terminology used. In the present disclosure, the access node may also be referred to as a Base Station (BS). The access node may be of different classes such as e.g. macro eNodeB, home eNodeB or pico base station, or relay node in heterogeneous or homogeneous networks, based on transmission power and thereby also cell size.

Figure 5:
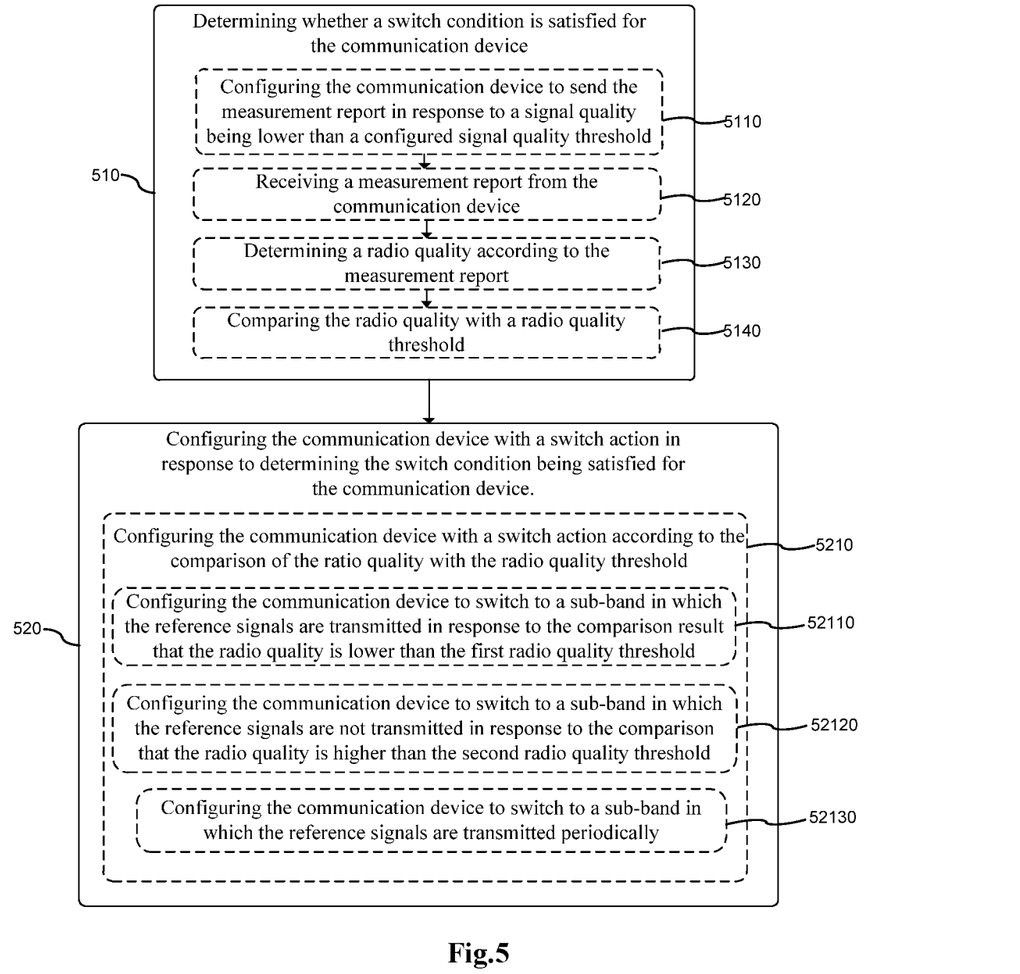
FIG. 5 schematically illustrates an exemplary flow diagram for an access node configuring a device switching from an operation sub-band for mobility measurement in a wireless network according to one or more embodiments of the present invention.

FIG. 5 schematically illustrates an exemplary flow diagram for an access node configuring a device switching from an operation sub-band for mobility measurement in a wireless network according to one or more embodiments of the present invention.

In step S10, the access node determines whether switch condition is satisfied for a communication device. The switch condition could be based on the radio quality of the communication device or load of the sub-band in which the reference signals for mobility measurement are transmitted, which will be discussed in detail as below.

According to one embodiment of the disclosure, in step S120, the access node receives a measurement report from the communication device. In step S130, the access node determines a radio quality according to the measurement report from the communication device. For example, the radio quality may be determined as an average of a plurality of radio qualities received in one or more measurement reports from the communication device. In step S140, the access node compares the determined radio quality with a radio quality threshold to determine whether a switch condition is satisfied for the communication device. According to another embodiment of the disclosure, in step S110, the access node may configure the communication device to send the measurement report in response to a signal quality being lower than a configured signal quality threshold in order to reduce overhead of measurement reports from the communication device.

In step S20, the access node configures the communication device with a switch action in response to determining the switch condition is satisfied for the communication device. This configuration from the access node to the communication device may be transmitted via different signalings, such as a Radio Resource Control (RRC) signalling, Media Access Control (MAC) signalling (e.g. MAC control element (CE) signalling) in LTE or next generation communication systems. It should be also appreciated that the radio quality could be RSRP, RSRQ, RSSI, SNR or SINR, which can be chosen by one skilled in the art according to different system implementation and application scenarios.

According to one embodiment of the disclosure, in step S210, the access node may configure the communication device with a switch action according to the comparison result of the radio quality with the radio quality threshold. According to another embodiment of the disclosure, an operation sub-band of the communication device is a sub-band in which the reference signals for mobility measurement are not transmitted, and the radio quality threshold is a first radio quality threshold. In step S2110, the access node may configure the communication device to switch to a sub-band in which the reference signals for mobility measurement are transmitted in response to the comparison result that the radio quality is lower than the first radio quality threshold. According to another embodiment of the disclosure, an operation sub-band of the communication device is a sub-band in which the reference signals for mobility measurement are transmitted, and the radio quality threshold is a second radio quality threshold. In step S2120, the access node may configure the communication device to switch to a sub-band in which the reference signals for mobility measurement are not transmitted in response to the comparison result that the radio quality is higher than the second radio quality threshold. According to another embodiment of the disclosure, an operation sub-band of the communication device is a sub-band in which the reference signals for mobility measurement are not transmitted and in step S2130, the access node may configure the communication device to switch to a sub-band in which the reference signals for mobility measurement are transmitted periodically.

Figure 6:
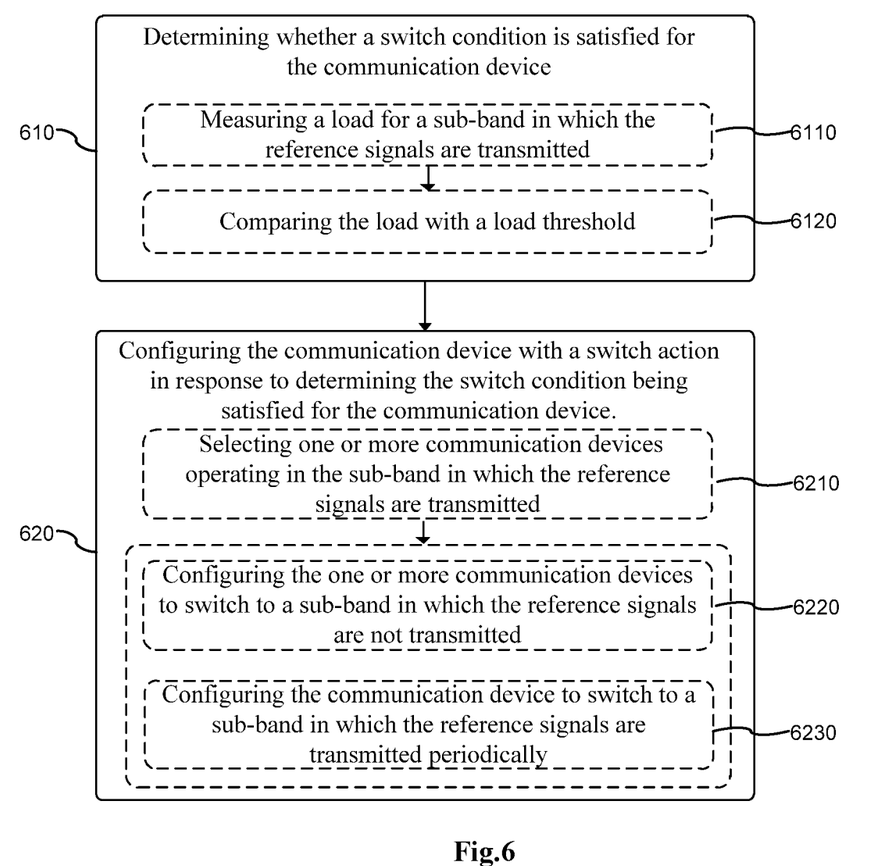
FIG. 6 schematically illustrates another exemplary flow diagram for an access node configuring a device switching from an operation sub-band for mobility measurement in a wireless network according to one or more embodiments of the present invention.

FIG. 6 schematically illustrates another exemplary flow diagram for an access node configuring a device to switch from an operation sub-band for mobility measurement in a wireless network according to one or more embodiments of the present invention.

In step 610, the access node determines whether a switch condition is satisfied for the communication device. According to one embodiment of the disclosure, in step 6110, the access node measures a load for a sub-band in which the reference signals for mobility measurement are transmitted. For example, the load could be measured based on the time and frequency resource utilization of the sub-band in which the reference signals for mobility measurement are transmitted. In step 6120, the access node compares the load with a load threshold to determine whether the sub-band in which the reference signals for mobility measurement are transmitted is overloaded.

In step 620, the access node configures the communication device with a switch action in response to determining the switch condition is satisfied for the communication device. According to one embodiment of the disclosure, in step 6210, the access node may select one or more communication devices operating in the sub-band in which the reference signals for mobility measurement are transmitted.

For one example, the selection of the one or more communication device may be performed randomly or in round-robin fashion. For another example, the selection of the one or more communication devices may be performed according to the service priority or requirement of the communication device. For a further example, the communication devices with a low priority service may be selected first. It is noted that the person skilled in the art could employ different selection mechanisms with the teaching and suggestion in this disclosure. In step 6220, the access node may configure the one or more communication devices to switch to a sub-band in which the reference signals for mobility measurement are not transmitted so that the load of the sub-band in which the reference signals for mobility measurement are transmitted becomes lower than another load threshold. According to another embodiment of the disclosure, the access node may configure the communication device to switch to a sub-band in which the reference signals for mobility measurement are transmitted periodically. As discussed above, the service for the communication device is continuously provided, and meanwhile the communication device may perform mobility measurement in the sub-band with reference signals for mobility measurement transmitted therein to determine if there is a neighbor cell good enough for handover.

According to a further embodiment of the disclosure, when an operation sub-band of the communication device is switched to, some configurations can be stored for the communication device in case the communication device is switched back, in order to save signaling overhead. The following configurations can be reused when the communication device switches back to the previous operation sub-band: Downlink Control Information (DCI) search space, CSI-RS configurations and CSI report configurations, numerology and/or Transmission Time Interval (TTI) duration configurations for example. When the communication device is switched back to the previous operation sub-band, the communication device may fetch these configurations from its local memory and applies these configurations. Some configurations may remain unchanged during operation sub-band switching: Discontinuous Reception (DRX) timer values, power control parameters and CSI report configuration.

Figure 7:
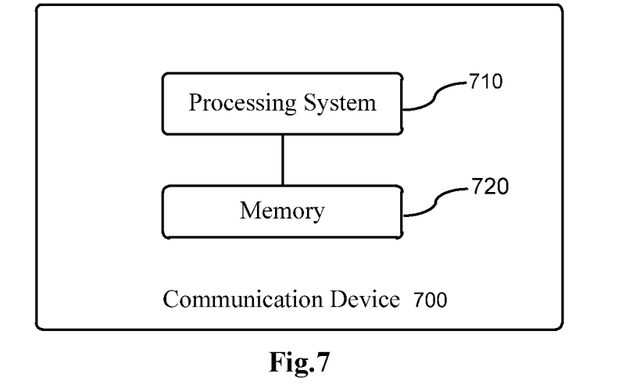
FIG. 7 schematically illustrates a block diagram of a communication device according to one or more embodiments of the present invention.

FIG. 7 schematically illustrates a block diagram of a communication device according to one or more embodiments of the present invention.

The communication device may for example correspond to the communication device described in connection with FIG. 1. The communication device comprises a memory storing instructions and a processing system configured to execute the instructions performing the steps of the method illustrated in connection with FIG. 1. For example, the processing system may include one or more microprocessors or microcontrollers, as well as other digital hardware, which may include Digital Signal Processors (DSP), special-purpose digital logic, and the like. The processors may be configured to execute program code stored in memory. Instructions stored in memory includes program codes for executing one or more telecommunications and/or data communications protocols as well as program codes for carrying out one or more of the techniques described herein, in several embodiments. For example, the memory may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory has stored thereon suitably configured program code to be executed by the processing system so as to implement the above-described functionalities of the communication device. In particular, the memory may include various program code modules for causing the communication device to perform processes as described above, e.g., corresponding to the method steps of FIG. 1. The communication device may also comprise at least one interface (not shown) for communicating with the access node, e.g. a wireless interface. The interface could be coupled to the processing system. Information and data as described above in connection with the methods may be sent via the interface.

Figure 8:
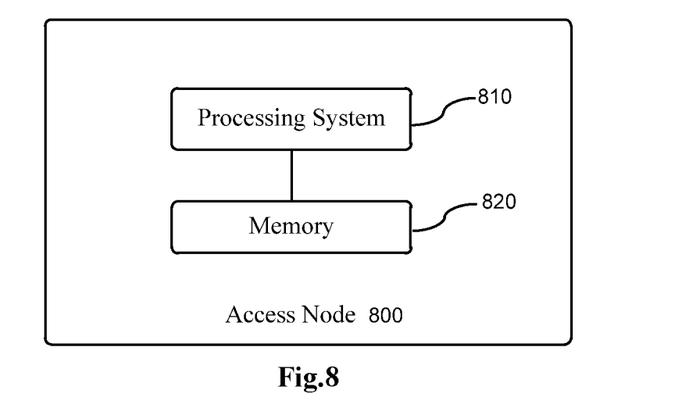
FIG. 8 schematically illustrates a block diagram of an access node according to one or more embodiments of the present invention.

FIG. 8 schematically illustrates a block diagram of an access node according to one or more embodiments of the present invention.

The access node may for example correspond to the access node described in connection with FIGS. 5-6. The access node comprises a memory storing instructions and a processing system configured to execute the instructions performing the steps of the method illustrated in connection with FIGS. 5-6. For example, the processing system may include one or more microprocessors or microcontrollers, as well as other digital hardware, which may include DSP, special-purpose digital logic, and the like. The processors may be configured to execute program code stored in memory. Instructions stored in memory includes program codes for executing one or more telecommunications and/or data communications protocols as well as program codes for carrying out one or more of the techniques described herein, in several embodiments. For example, the memory may include a ROM, e.g., a flash ROM, a RAM, e.g., a DRAM or SRAM, a mass storage, e.g., a hard disk or solid state disk, or the like. The memory has stored thereon suitably configured program code to be executed by the processing system so as to implement the above-described functionalities of the access node. In particular, the memory may include various program code modules for causing the access node to perform processes as described above, e.g., corresponding to the method steps of any one of FIGS. 5-6. The access node may also comprise at least one interface (not shown) for communicating with the communication device, e.g. a wireless interface, and/or for communicating with the neighboring access nodes, e.g. a wired or wireless interface. The interface could be coupled to the processing system. Information and data as described above in connection with the methods may be sent via the interface.

The present disclosure may also be embodied in the computer program product which comprises all features capable of implementing the method as depicted herein and may implement the method when loaded to the computer system. A set of software modules may correspond to a set of respective steps or actions in any method described in conjunction with FIG. 1, 5 or 6, and it is appreciated for the person skilled in the art that the aforementioned modules could be implemented via Programmable Logic Device (PLD), Field Programmable Gate Array (FPGA), Application Specific Integrated Circuit (ASIC), and other implement mechanisms as software products, application specific firmware, hardware products and a combination thereof.

In general, the various exemplary embodiments may be implemented in hardware or special purpose circuits, software, logical or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block and signaling diagrams, it is well understood that these blocks, apparatus, systems, techniques or methods described herein may be implemented in, as non-limiting examples, hardware, software, firmware, special purpose circuits or logical, general purpose hardware or controller or other computing devices, or some combination thereof.

The present disclosure has been specifically illustrated and explained with reference to the preferred embodiments. The skilled in the art should understand various changes, variation, or modifications thereto in form and details may be made without departing from the spirit and scope of the present disclosure.

The invention claimed is:

1. A method for an access node in a wireless network, wherein a system carrier of the wireless network comprises a plurality of sub-bands, and reference signals for mobility measurement are transmitted in at least one of the plurality of sub-bands, the method comprising:
   determining whether a switch condition is satisfied for a communication device operating in a sub-band in which the reference signals are not transmitted; and
   configuring the communication device with a switch action, in response to determining the switch condition being satisfied for the communication device, to switch from the operating sub-band to a sub-band in which the reference signals are transmitted periodically.

2. The method according to claim 1, wherein the determining whether the switch condition is satisfied further comprises:
   receiving a measurement report from the communication device;
   determining a radio quality according to the measurement report;
   comparing the radio quality with a radio quality threshold; and
   wherein the configuring the communication device with the switch action further comprises:
      configuring the communication device with the switch action according to a comparison result of comparing the radio quality with the radio quality threshold.

3. The method according to claim 2, wherein the determining whether the switch condition is satisfied for the communication device further comprises:
   configuring the communication device to send the measurement report in response to a signal quality of the communication device being lower than a configured signal quality threshold.

4. The method according to claim 2, wherein the configuring the communication device with the switch action is in response to the comparison result that the radio quality is lower than the radio quality threshold.

5. A communication device in a wireless network, wherein a system carrier of the wireless network comprising a plurality of sub-bands, and reference signals for mobility measurement being transmitted in at least one of the plurality of sub-bands, the communication device comprising:
   a memory storing instructions; and
   a processing system configured to execute the instructions to cause the communication device, operating in an operation sub-band in which the reference signals are not transmitted, to:
      measure a signal quality for the operation sub-band;
      compare the signal quality with a signal quality threshold;

determine a switch action according to a comparison of the signal quality with the signal quality threshold; and switch from the operation sub-band to a sub-band in which the reference signals are transmitted periodically according to the determined switch action.

6. The communication device according to claim 5, wherein the switch action is based on the comparison that the signal quality is lower than the signal quality threshold.

7. An access node in a wireless network, wherein a system carrier of the wireless network comprising a plurality of sub-bands, and reference signals for mobility measurement being transmitted in at least one of the plurality of sub-bands, the access node comprising:

a memory storing instructions; and a processing system configured to execute the instructions to cause the access node to:

determine whether a switch condition is satisfied for a communication device operating in a sub-band in which the reference signals are not transmitted; and configure the communication device with a switch action, in response to determining the switch condition being satisfied for the communication device, to switch from the operating sub-band to a sub-band in which the reference signals are transmitted periodically.

8. The access node according to claim 7, wherein the instructions further cause the access node to:

receive a measurement report from the communication device;

determine a radio quality according to the measurement report; and compare the radio quality with a radio quality threshold; and configure the communication device with a switch action according to a comparison of the radio quality with the radio quality threshold.

9. The access node according to claim 8, wherein the instructions further cause the access node to:

configure the communication device to send the measurement report in response to a signal quality of the communication device being lower than a configured signal quality threshold.

10. The access node according to claim 8, wherein the access node configures the communication device with the switch action, in response to the comparison that the radio quality being lower than the radio quality threshold.

* * * * *

UNITED STATES PATENT AND TRADEMARK OFFICE
CERTIFICATE OF CORRECTION

PATENT NO. : 10,652,778 B2
APPLICATION NO. : 15/740797
DATED : May 12, 2020
INVENTOR(S) : Liu et al.

Page 1 of 1

It is certified that error appears in the above-identified patent and that said Letters Patent is hereby corrected as shown below:

In the Specification

In Column 5, Line 40, delete "T" and insert -- T. --, therefor.

In Column 6, Line 26, delete "In formation" and insert -- Information --, therefor.

In Column 8, Line 45, delete "S10," and insert -- 510, --, therefor.

In Column 8, Line 52, delete "S120," and insert -- 5120, --, therefor.

In Column 8, Line 53, delete "S130," and insert -- 5130, --, therefor.

In Column 8, Line 58, delete "S140," and insert -- 5140, --, therefor.

In Column 8, Line 62, delete "S110," and insert -- 5110, --, therefor.

In Column 9, Line 1, delete "S20," and insert -- 520, --, therefor.

In Column 9, Line 15, delete "S210," and insert -- 5210, --, therefor.

In Column 9, Line 22, delete "S2110," and insert -- 52110, --, therefor.

In Column 9, Line 31, delete "S2120," and insert -- 52120, --, therefor.

In Column 9, Line 40, delete "S2130," and insert -- 52130, --, therefor.

Signed and Sealed this
First Day of September, 2020

Andrei Iancu
*Director of the United States Patent and Trademark Office*